(12) United States Patent
Shefet

(10) Patent No.: US 7,040,974 B2
(45) Date of Patent: May 9, 2006

(54) CASINGLESS FOOD PRODUCTION METHODS, SYSTEMS, AND ASSOCIATED TRAVELING MATABLE MOLD SHELLS

(75) Inventor: Sarid M. Shefet, Cary, NC (US)

(73) Assignee: ConAgra Foods, Inc., Edina, MN (US)

( * ) Notice: Subject to any disclaimer, the term of this patent is extended or adjusted under 35 U.S.C. 154(b) by 252 days.

(21) Appl. No.: 10/232,141

(22) Filed: Aug. 30, 2002

(65) Prior Publication Data

US 2004/0043718 A1    Mar. 4, 2004

(51) Int. Cl.
A22C 11/02    (2006.01)

(52) U.S. Cl. ...................................................... 452/35

(58) Field of Classification Search ................. 99/426, 99/427, 439, 428, 450.6, 450.7, 451, 452, 99/374, 377, 378, 645, 362, 381–383, 442, 99/450.8; 426/238, 92, 241–243, 245, 246, 426/247, 277, 282–284, 383, 512–517, 519, 426/520; 452/30–35, 37, 46, 51, 21, 22
See application file for complete search history.

(56) References Cited

U.S. PATENT DOCUMENTS

| 3,857,330 | A | * | 12/1974 | Ruckstaetter ................ 99/354 |
|---|---|---|---|---|
| 4,079,666 | A | | 3/1978 | Plemons et al. .............. 99/355 |
| 4,258,066 | A | * | 3/1981 | Bernard ...................... 422/146 |
| 4,371,554 | A | * | 2/1983 | Becker ........................ 426/243 |
| 4,448,793 | A | * | 5/1984 | Akesson ..................... 426/241 |
| 4,565,282 | A | | 1/1986 | Olsson et al. ............... 198/778 |
| 4,582,047 | A | | 4/1986 | Williams .................... 126/369 |
| 4,766,645 | A | | 8/1988 | Lamartino et al. ............. 17/49 |
| 4,997,365 | A | | 3/1991 | Lanham ....................... 432/121 |
| 5,049,108 | A | | 9/1991 | Staudenrausch ............... 452/48 |
| 5,078,120 | A | | 1/1992 | Hwang ........................ 126/21 A |
| 5,141,762 | A | * | 8/1992 | Mally ......................... 426/412 |
| 5,277,301 | A | | 1/1994 | Fenty ......................... 198/778 |
| 5,296,247 | A | * | 3/1994 | Huang et al. ................ 426/283 |
| 5,480,346 | A | | 1/1996 | Kasai et al. .................. 452/47 |
| RE35,259 | E | | 6/1996 | Williams .................... 126/369 |
| 5,788,563 | A | | 8/1998 | Nakamura et al. ............ 452/47 |

(Continued)

FOREIGN PATENT DOCUMENTS

FR    2.088.622    4/1970

OTHER PUBLICATIONS

Article, "Continuous Process Systems", Alkar, http://www.alkar.com (date unavailable; believed to be dated before Mar. 1, 2002) pp. 1-3.

(Continued)

*Primary Examiner*—Thomas Price
(74) *Attorney, Agent, or Firm*—Myers Bigel Sibley & Sajovec PA

(57) ABSTRACT

Systems, methods, and associated devices for casingless production of food products include: (a) providing a series of shells, the shells having sufficient structural rigidity to define an enclosed cavity space of predetermined substantially constant size and shape; (b) injecting a quantity of flowable food emulsion into the shells in serial order; (c) moving the shells forward along a predetermined travel path with the emulsion in the enclosed cavities; (d) exposing the emulsion in the shells to predetermined processing conditions that alter the emulsion held in the respective shells to a non-flowable edible food product having the molded shape of their respective shell cavities; and then (e) releasing the non-flowable food products from their respective shells.

41 Claims, 9 Drawing Sheets

U.S. PATENT DOCUMENTS

| | | | | |
|---|---|---|---|---|
| 5,871,793 | A * | 2/1999 | Capodieci | 426/238 |
| 5,942,265 | A | 8/1999 | Roberds et al. | 426/59 |
| 6,146,674 | A * | 11/2000 | Manna et al. | 426/238 |
| 6,183,826 | B1 * | 2/2001 | Quinones et al. | 428/34.8 |
| 6,279,646 | B1 | 8/2001 | Ross et al. | 164/507 |
| 6,322,832 | B1 * | 11/2001 | Schiffmann | 426/246 |
| 6,326,039 | B1 * | 12/2001 | Schiffmann et al. | 426/238 |

OTHER PUBLICATIONS

Article, "Batch Ovens", Alkar, http://www.alkar.com (date unavailable; believed to be dated before Mar. 1, 2002) pp. 1-3.

Brochure, "Fessmann Turbomat 7000: Industrial Smoking and Cooking", Fessman Group (date unavailable; believed to be dated before Mar. 1, 2002) pp. 1-8.

Brochure, "Fessmann Smoking Cooking Cooling", Fessman Group (date unavailable; believed to be dated before Mar. 1, 2002) pp. 1-8.

Brochure, "Fessmann Transfer 4000: Continuous Smoking, Cooking and Cooling", Fessman Group (date unavailable; believed to be dated before Mar. 1, 2002) pp. 1-9.

Pictures of the inside of a conventional prior art oven from Alkar.

U.S. Appl. No. 10/231,835, filed Aug. 30, 2002.
U.S. Appl. No. 10/232,139, filed Aug. 30, 2002.

* cited by examiner

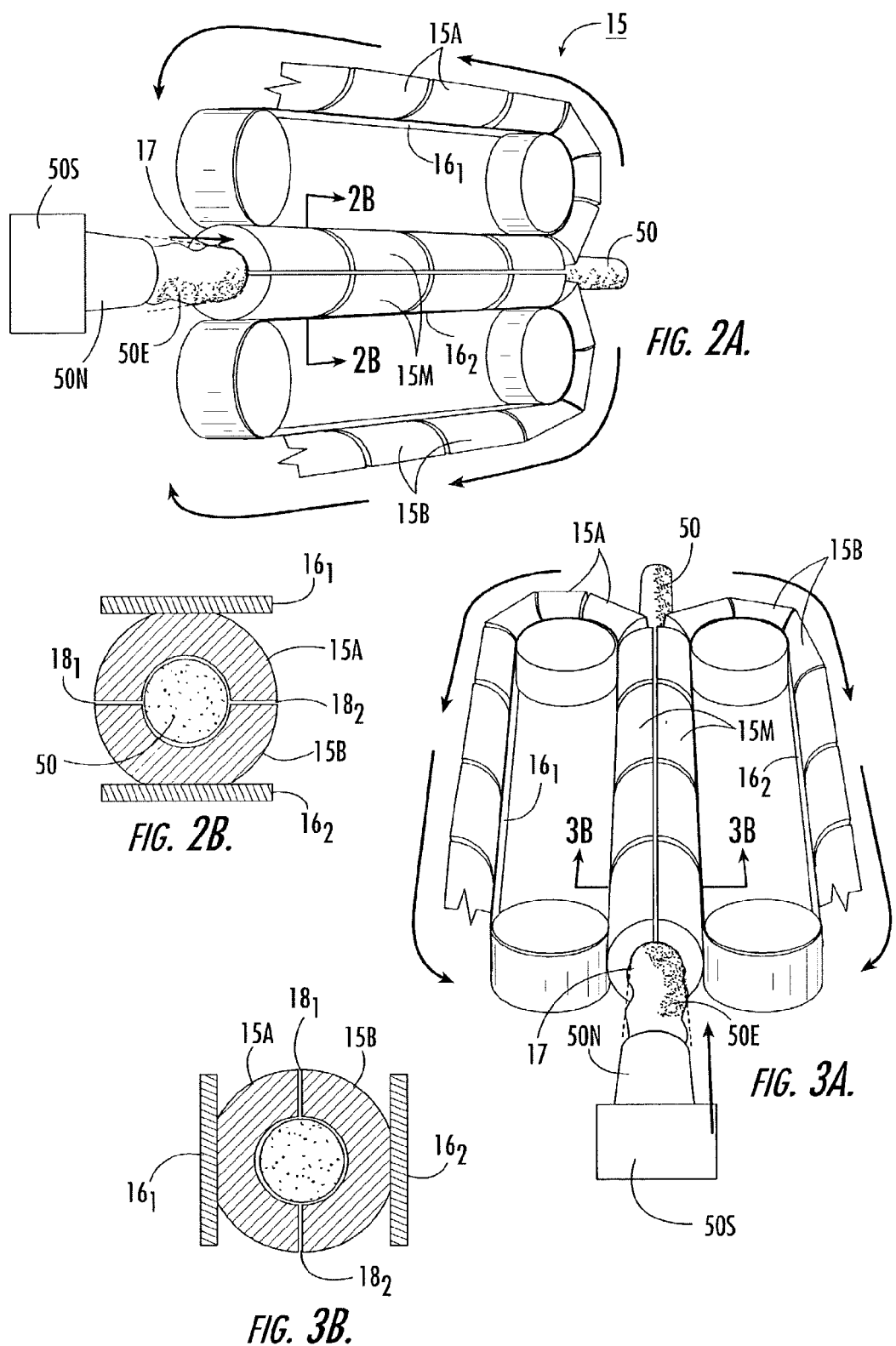

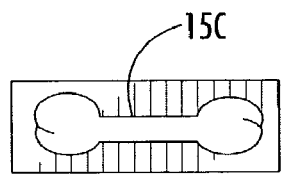
FIG. 4A.
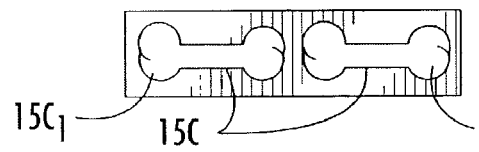
FIG. 4B.
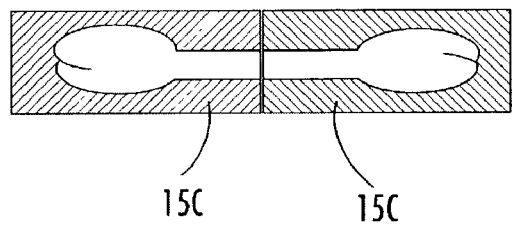
FIG. 4C.
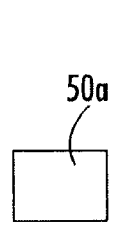  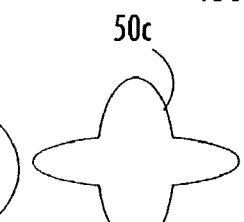  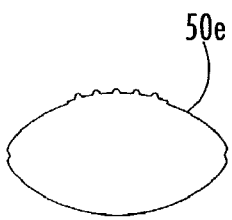
FIG. 5A.  FIG. 5B.  FIG. 5C.  FIG. 5D.  FIG. 5E.
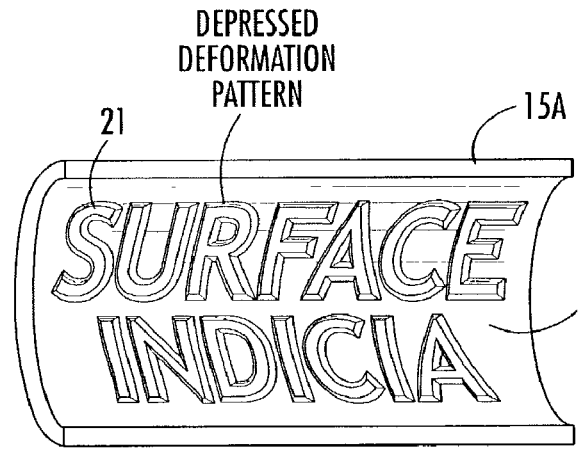
FIG. 6A.
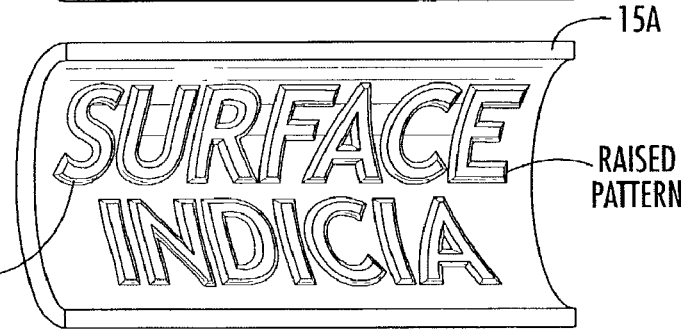
FIG. 6B.

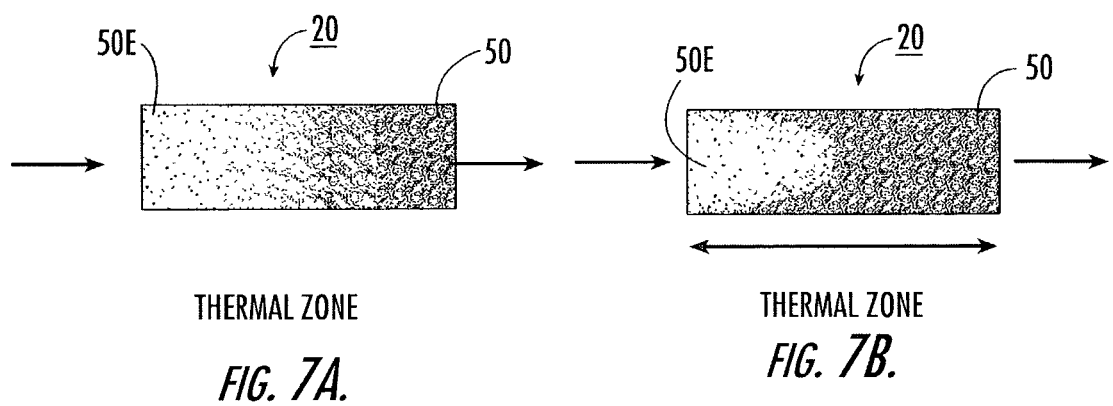
FIG. 7A.
FIG. 7B.
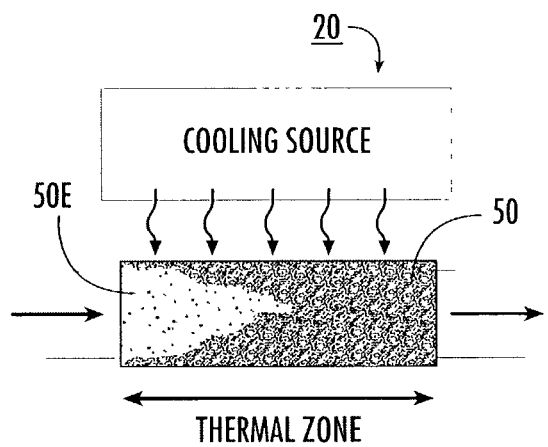
FIG. 8.

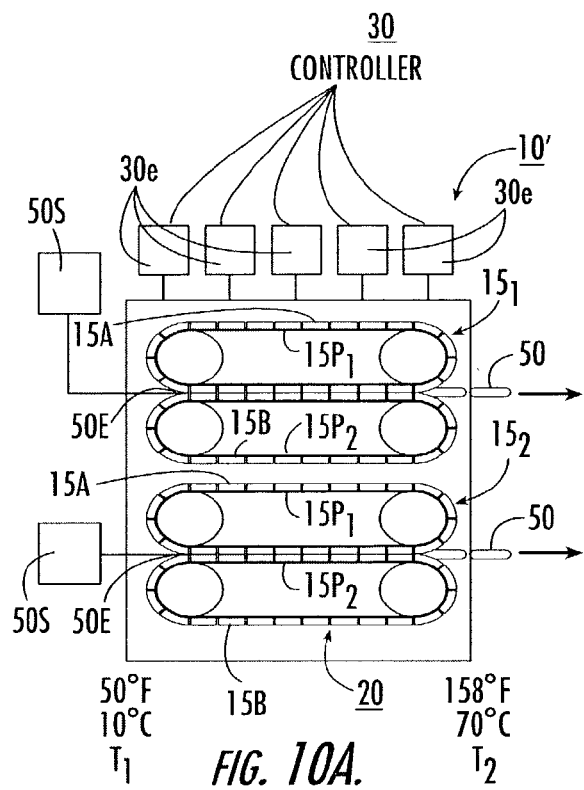
FIG. 10A.
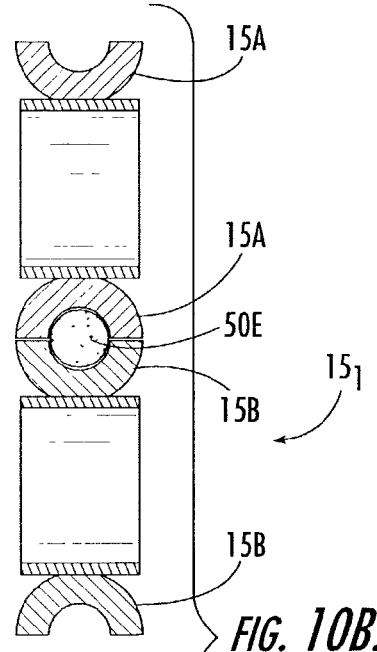
FIG. 10B.
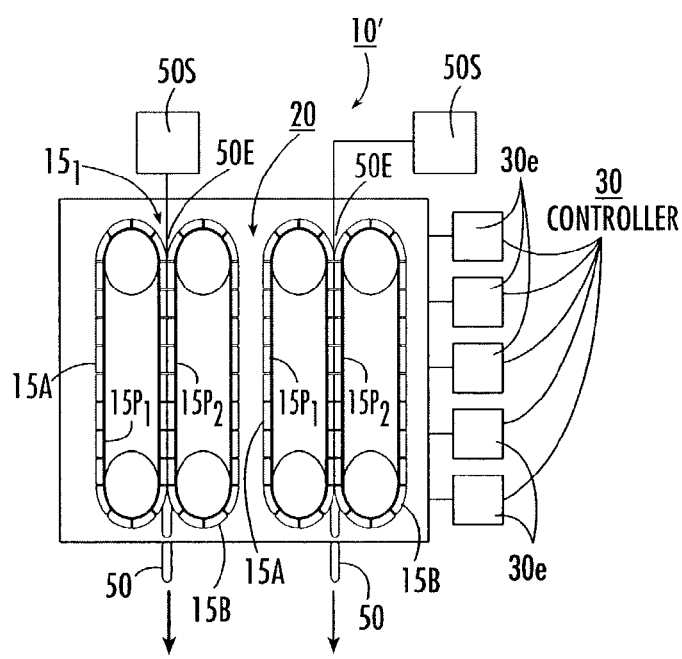
FIG. 10C.
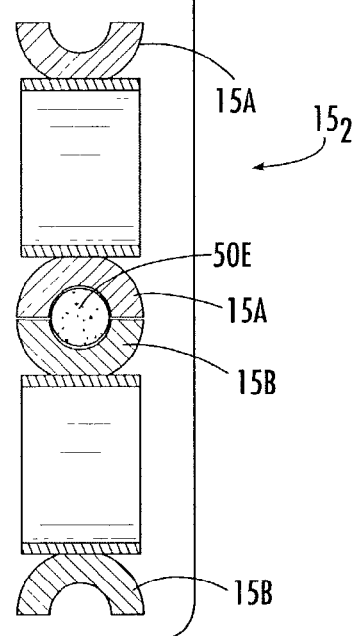

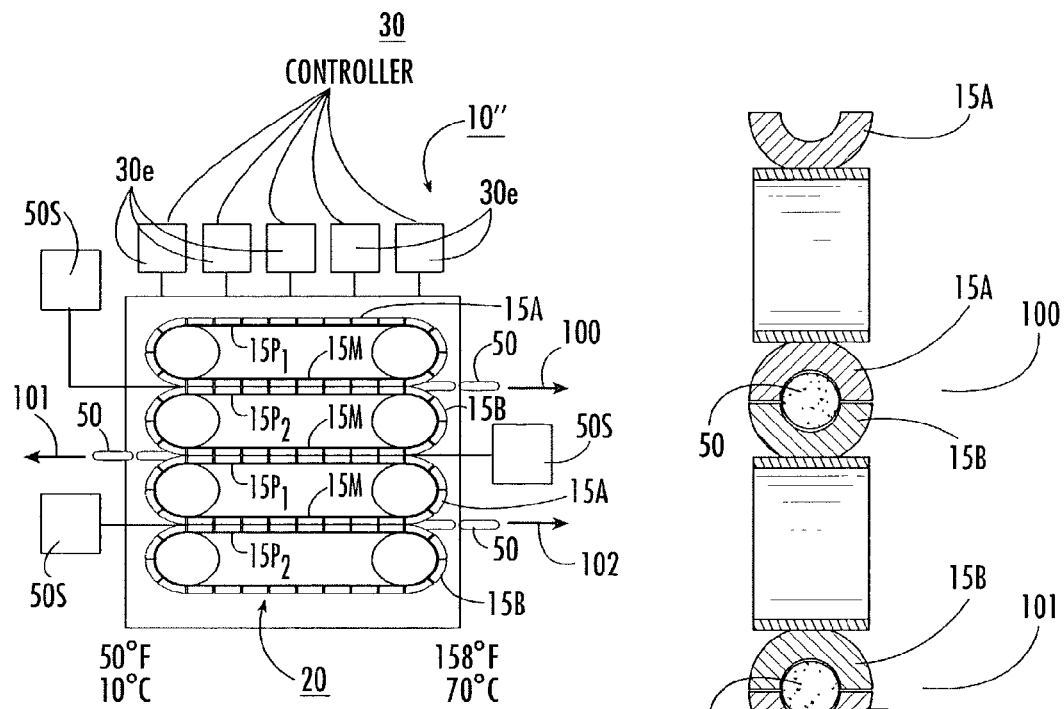
FIG. 11A.
FIG. 11B.
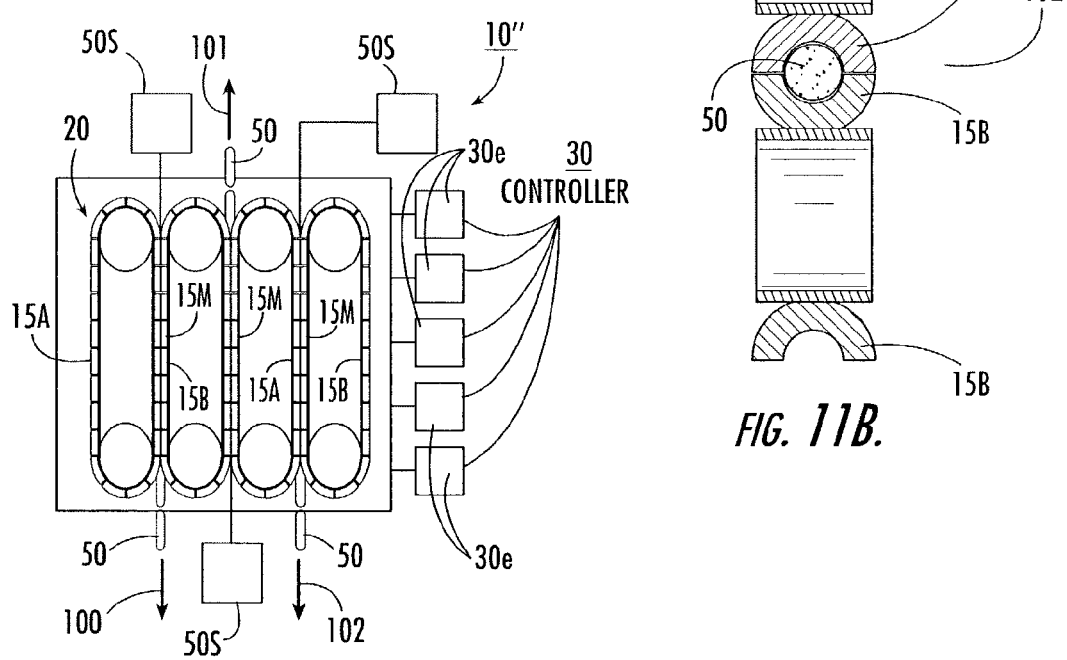
FIG. 11C.

CASINGLESS FOOD PRODUCTION METHODS, SYSTEMS, AND ASSOCIATED TRAVELING MATABLE MOLD SHELLS

FIELD OF THE INVENTION

The present invention relates to the casingless production of food product.

BACKGROUND OF THE INVENTION

Conventionally, natural or artificial casings can be used to form and hold food products to help hold the shape and/or retain content integrity during processing, such as cooking, heating, or freezing. The food product can start as a flowable emulsion that can be stuffed into the casing or the casing can be formed around the emulsion by employing a co-extrusion process using a stuffer, extruder, or the like. The casing itself may be disposable and removed from the food product prior to shipping and/or eating or may remain intact on the food product during consumption and ingested.

Known extruders and co-extruders are available from various commercial manufacturers including, but not limited to, the Kontura from Townsend Engineering Co., located in Des Moines, Iowa. Stuffers are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in full herein.

However, there remains a need to provide cost-effective automated casingless processing systems of food items.

SUMMARY OF THE INVENTION

The present invention provides casingless food production systems and methods. The term "casingless" means that the food product can be produced without requiring the assistance of a holding skin such as a collagen or natural skin casing. The term encompasses food items that are conventionally produced using casings (such as hot dogs and sausages and the like), as well as food items that have not required the use of casings (meatballs, popsicles, baked goods, shaped burgers, and the like).

In certain embodiments, the methods and systems are configured to provide casingless lengths of food product using endless travel matable mold shells. The food product can be configured to enter the matable mold shells as a flowable emulsion that is held encased in the matable mold shells while the mold shells and the product held therein travel along a predetermined travel path.

In operation, as the product and shell move forward, the product is exposed to predetermined processing conditions that alter the physical form of the emulsion to a non-flowable state. The change in the physical state can be chemically or thermally initiated. Over time, the product can take on the shape of the matable mold shell with sufficient structural rigidity so that it is able to retain that shape without substantial deformation after its release therefrom. As such, in certain embodiments, the released food item may be compressible (semi-solid and yielding to tactile compression forces) or substantially incompressible (frozen or solid) at ambient conditions.

The food may be elongated and regularly shaped (in an elongated or substantially cylindrically configuration) or may be non-elongated and irregularly shaped. The food may be cooked, frozen, smoked, cured, pickled, partially dehydrated, or otherwise processed as it moves through the processing region.

Systems, methods, and associated devices for casingless production of food products include: (a) providing a series of shells, the shells having sufficient structural rigidity to define an enclosed cavity space of predetermined substantially constant size and shape; (b) injecting a quantity of flowable food emulsion into the shells in serial order; (c) moving the shells forward along a predetermined travel path with the emulsion in the enclosed cavities; (d) exposing the emulsion in the shells to predetermined processing conditions that alter the emulsion held in the respective shells to a non-flowable edible food product having the molded shape of their respective shell cavities; and then (e) releasing the non-flowable food products from their respective shells.

Other embodiments are directed to casingless food production systems. The systems include: (a) a plurality of shells arranged in an endless travel path, the shells configured with at least one emulsion entry port and first and second detachably matable shell portions, the shell portions are configured to matably attach together to provide an enclosed cavity having a predetermined configuration, and to part to allow access to the interior of the cavity; (b) a flowable food emulsion source comprising a flow nozzle that is configured to serially flowably input a quantity of emulsion into the shells; (c) a transport system that is configured to move the plurality of shells along the endless travel path so that each shell is positioned in cooperating alignment with the food emulsion source at least once during each cycle of travel along the endless travel path; and (d) a processing region operably associated with the endless travel path so that, in operation, the processing region exposes the emulsion in the attached shells to a predetermined energy as the shells travel along a portion of the endless travel path.

Other embodiments are directed to casingless food production systems that include: (a) means for providing a series of aligned shells, the shells having sufficient structural rigidity to define an enclosed cavity space of predetermined size and shape; (b) means for injecting in serial order a quantity of flowable food emulsion into the shells; (c) means for moving the shells forward along a predetermined travel path with the emulsion in the enclosed cavities; (d) means for exposing the emulsion in the shells to predetermined processing conditions; (e) means for altering the physical form of the emulsion held in the respective shells to a non-flowable edible food product; (f) means for molding the emulsion in the shells so that the released food products have the shape of their respective shell cavity; and then (g) means for releasing the non-flowable food products from their respective shells.

Still other embodiments are directed to mold assemblies for the production of foodstuffs. The assemblies include: (a) a first mold portion having a first inner cavity region; (b) a second mold portion having a second inner cavity region, the first and second mold portions being detachably matable theretogether so that the first and second inner cavity regions align to define a mold cavity having a predetermined three dimensional foodstuff mold shape; and (c) a transport system operably associated with the first and second mold portions that automatically moves the first and second mold portions in respective endless paths that allows the first and second mold portions to matably attach and then detach as they travel along their respective endless paths.

These and other objects and aspects of the present invention are explained in detail in the specification set forth below.

BRIEF DESCRIPTION OF THE DRAWINGS

FIG. 2A is a side perspective view of a portion of a traveling mold arrangement according to embodiments of the present invention.

FIG. 2B is a front sectional view taken along line 2B—2B in FIG. 2A.

FIG. 3A is an end perspective view of a portion of a traveling mold arrangement according to embodiments of the present invention FIG. 3B is a front section view taken along line 3B—3B in FIG. 3A.

FIG. 4A is a side view of one side of a mold with an irregularly shaped, side profile, three-dimensional mold cavity according to embodiments of the present invention.

FIG. 4B is a side view of one side of a mold with an irregularly shaped, side profile, three-dimensional mold cavity that can mold multiple distinct foodstuff items in a single mold according to embodiments of the present invention.

FIG. 4C is a side view of one side of two adjacent molds (together the two adjacent molds forming an object with an irregular shaped side profile), the object occupying the adjacent complementary mold cavity spaces to provide the desired three-dimensional mold cavity according to embodiments of the present invention.

FIGS. 5A–5E are front cross-sectional views of mold cavity shapes configured to provide non-customary cross-sectional profiles according to embodiments of the present invention. The same figures can also illustrate side profile views of the cavities, as desired. For example, the mold cavity may be configured to have a variable cross-sectional volume, front to back and side to side, to mold the foodstuff into a desired object shape (such as the football shown in FIG. 5E).

FIG. 6A is a side view of a portion of the inside of a mold cavity having surface indicia recessed into the inner wall or surface thereof according to embodiments of the present invention.

FIG. 6B is a side view of a portion of the inside of a mold cavity having raised surface indicia on the inner wall or surface thereof according to embodiments of the present invention.

FIGS. 7A and 7B are schematic illustrations of examples of alterations in the physical state or consistency of the emulsion held in the shell as it travels along the food travel path according to embodiments of the present invention.

FIG. 8 is a schematic illustration similar to FIGS. 7A and 7B illustrating that a cooling source may be used in the processing region to facilitate the molding or alteration of the flowable emulsion to a non-flowable molded shape.

FIG. 10A is a schematic illustration of a dual line processing system according to embodiments of the present invention.

FIG. 10B is an enlarged end section view of the dual line mold assembly shown in FIG. 10A.

FIG. 10C is a schematic illustration of a dual line processing system similar to that shown in FIG. 10A, but showing a vertical food travel path, according to embodiments of the present invention.

FIG. 11A is a schematic illustration of a cooperating nested arrangement of traveling molds for a plurality of production lines in a processing system according to embodiments of the present invention.

FIG. 11B is an enlarged end cross-sectional view of the cooperating molds in the production lines shown in FIG. 11A.

FIG. 11C is a schematic illustration of a processing system similar to that shown in FIG. 11A, but showing vertical food travel paths according to embodiments of the present invention.

DESCRIPTION OF EMBODIMENTS OF THE INVENTION

Figure 1A:
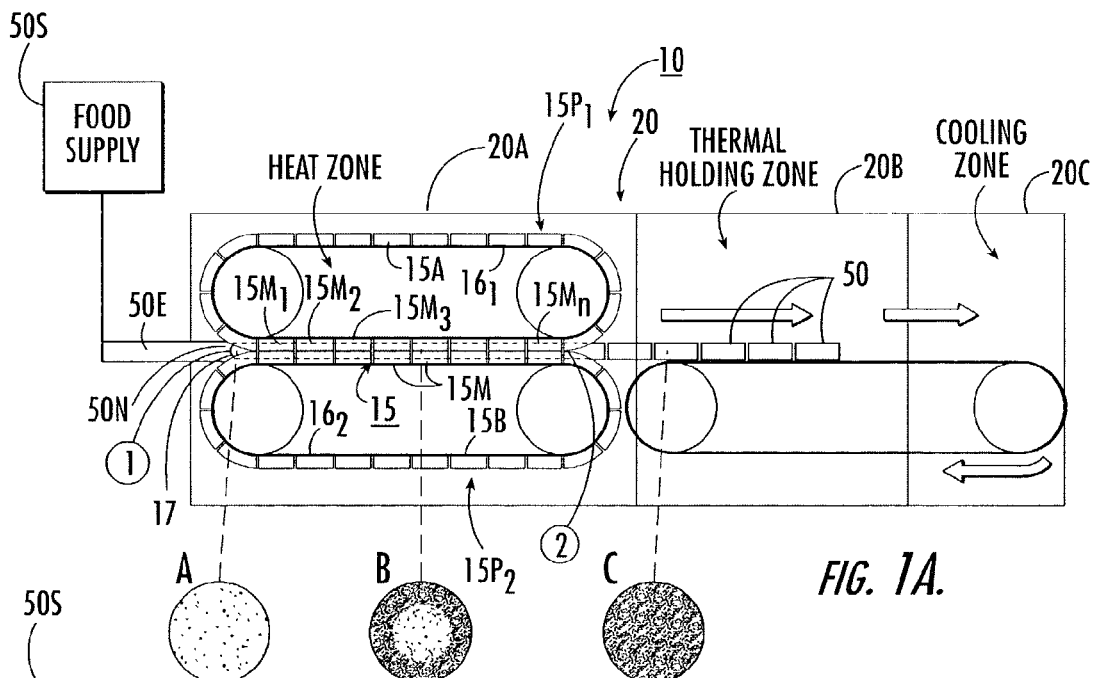
FIG. 1A is a schematic side view of a casingless foodstuff production system employing traveling molds according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The present invention may be particularly suitable to produce food items such as, but not limited to, elastic or partially elastic food items such as meat products, cheese (e.g., mozzarella strands), or dough. In certain embodiments, the food products are whole or partial meat mixtures that include a single or multiple different types of meat including, but not limited to, beef, poultry, lamb, veal, and pork including derivatives and/or meat analogs of selected ones or combinations of the meat. Other animal, poultry, fish, or desired meats may also be employed where desired. The meat based food products may be meat sticks or strands, elongate meat products such as hot dogs, sausages (of any type including Vienna sausage (typically a beef, pork, and veal emulsion blend)), and the like. In other embodiments, the food products need not be elongate and can be candy and/or frozen dessert snack treats such as ice cream, yogurt, popsicles, and the like.

Generally described, in certain embodiments, the product is produced by introducing (typically injecting) under pressure a flowable food material(s) into the cavity of a shell (or mold) that is configured to encase the material. The terms "shell" and "mold" are used interchangeably herein. The flowable material can be configured as an emulsion or slurry of a single major constituent and a liquid (such as water or other food compatible liquid) or an emulsion or slurry mixture of several different major constituents. "Major" as used herein means that the constituent is present as a primary constituent typically as at least 10% of the volume of the emulsion or slurry. As the shell (which defines the mold cavity) with the encased food material travels forward along its selected travel path, the encased material alters to a non-flowable state and takes on the shape defined by the cavity of the shell. In certain embodiments, the product is exposed to predetermined processing conditions that alter the physical form of a flowable emulsion to a non-flowable state. The processing conditions can include one or more of thermal energy (hot or cold), microwave energy, RF energy, UV light, laser energy, and the like.

In certain embodiments, the change in the physical state can be chemically or thermally initiated. In particular embodiments, certain of the constituent ingredients may be chosen so that when combined and exposed to a predetermined activation condition, such as heat, they react to yield a desired change in the physical state or a desired change in the food value. Over time, the chemical or thermal initiated reaction can cause the product to harden or become more viscous and non-flowable and form into the shape of the matable mold shell. Upon release, the product has the shape of the mold cavity. As such, in certain embodiments, the released food item may be compressible (semi-solid and yielding to tactile compression forces) or substantially incompressible (frozen or solid) at ambient conditions. The shell or mold itself is configured with sufficient structural rigidity so that it is able to define the cavity without the emulsion held therein and to resist deformation when the emulsion is injected into the cavity under pressure in sufficient amount and force to cause the product to fill the cavity.

In certain embodiments, the flowable emulsion may be a meat product emulsion that can include additives, flavorings, vegetables, fruits, spices, or other edible biocompatible constituents. Some constituents of the flowable emulsion may include fluids, such as liquids, solid particulates of various sizes, and ground, shredded, segmented or otherwise processed meat, meat analogs, or derivatives thereof. In certain embodiments, the emulsion can be viscous, while in others it may be semi-viscous and/or substantially inviscid at the initiation of the process (such as at introduction into the shell). Thus, the systems contemplated by the present invention may be used to process food products in a wide variety of density ranges (low to high), such as water (to ice), fluffed creams, meat or meat analog slurries, and the like.

The emulsion can be selected to yield elongated food items including, but not limited to, hot dogs, sausages, and the like. The end item may be elastic so as to allow some stretching without unduly altering or deforming its desired shape (from that of the mold shape) after release from the mold cavity of the shell during processing. Alternatively, the emulsion and mold shells may be formulated so that discrete non-elongated products such as shaped meatballs and other food products may be produced.

In particular embodiments, after the product exits the mold cavity, or as it travels in the mold cavity, the product can be coated with a desired edible surface coating, such as, but not limited to, sugar, chocolate, candy sprinkles, and the like for sweet or dessert products or corn meal for corndogs, flour or other edible coating for other food products. The coating may be aerosolized, sprayed, or otherwise deposited onto all or selected exterior surfaces of the product.

Turning now to FIG. 1A, one embodiment of a casingless food production system 10 is shown. As shown, the system 10 includes a traveling mold assembly 15, a processing region 20, and a flowable foodstuff supply source 50S. The traveling mold assembly 15 includes a plurality of shells $15M_1$-$15Mn$, that are defined by detachably matable shell portions 15A, 15B. The shell portions 15A, 15B are shown as shell halves with an axially extending seam, but other configurations may also be employed. The circular shapes labeled as "A", "B", and "C" illustrate an exemplary alteration in density or flowability of the food as it travels along the food travel path. At location "A", the product is a flowable emulsion, at location "B" some physical alteration has occurred (illustrated as a thicker density at the outermost portions of the food), and at "C" the food has been processed so that it is of a substantially constant consistency through its center (e.g., cooked). The exemplarly condition of the food at location "B" can vary depending on the production exposure environments or thermal processing conditions. For example, RF or microwave thermal processing may result in a different food density gradient. Other alteration patterns may occur depending on the desired processing result, the type of processing employed, and the food being processed.

Figure 1B:
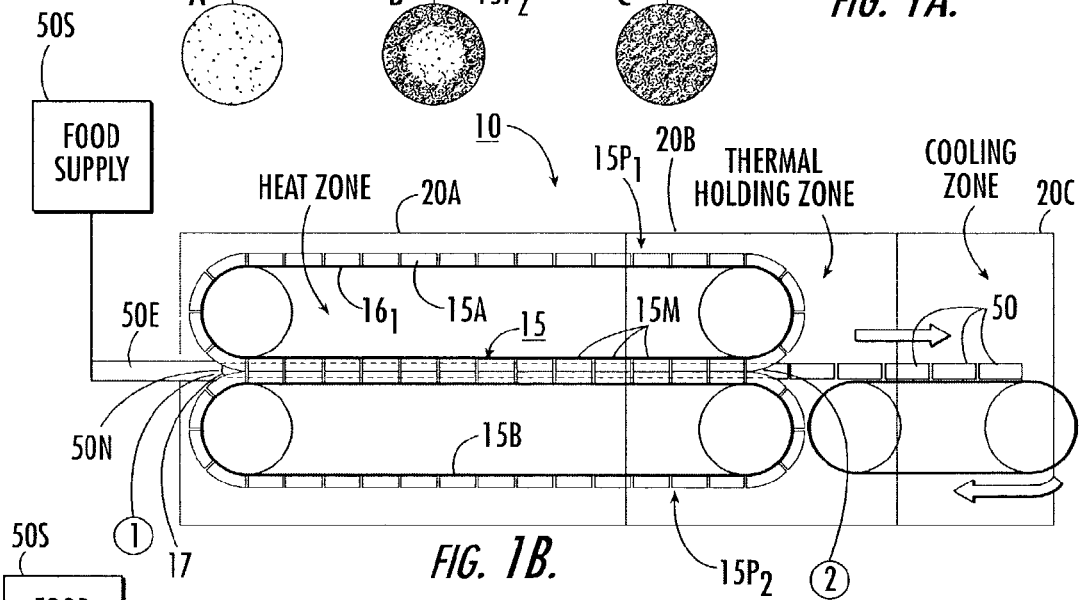
FIG. 1B is a schematic side view of a casingless production system, the molds thereof having an extended travel path over the embodiment shown in FIG. 1A according to other embodiments of the present invention.
Figure 1C:
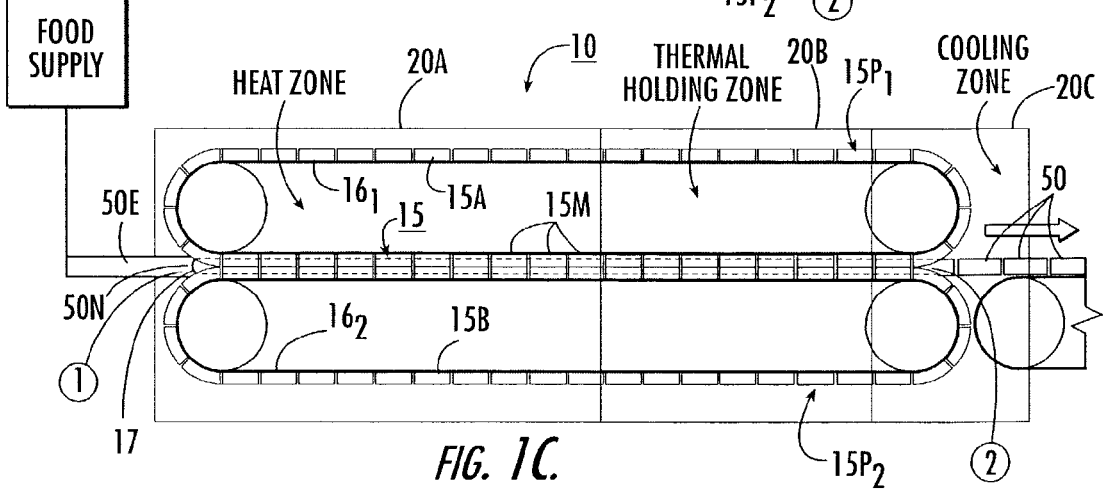
FIG. 1C is a schematic side view of a casingless production system, the molds thereof having an extended travel path over the embodiments shown in FIGS. 1A and 1B according to additional embodiments of the present invention.

In the embodiment shown in FIGS. 1A–1C, the first and second shell portions 15A, 15B are closely spaced end to end, about their respective endless paths. The system 10 or mold assembly 15 also includes a transport system 15S that moves the shells 15A, 15B along a predetermined travel path. The transport system 15S can comprise conveyors, chains, cables, cords, or other drive means connected to a drive motor to move the shell portions 15A, 15B, individually and the mated shells 15M together along the predetermined portions of the travel paths. As shown, the transport system 15S comprises two separate drives $16_1$, $16_2$, one for the first shell portion 15A and one for the second shell portion 15B. The timing of the two drives $16_1$, $16_2$ can be synchronized so that the mated shell portions 15M that define the mold cavity move along in unison at a desired rate of speed.

Each corresponding portion of the shell 15A, 15B travels along a respective endless travel path, $15P_1$, $15P_2$. In advance of the emulsion loading station or food supply source 50S, corresponding pairs of the shells mate to define a molding cavity for the emulsion. The region in the travel path at which the attachment is made is shown as location 1 in FIGS. 1A–1C. Downstream of the first location 1, the mated shell portions part or separate into separate components at a second location, shown as location 2 in FIGS. 1A–1C, to release the food product 50 held therein which has transformed into a non-flowable product having the shape of the molding cavity. The shell portions 15A, 15B then travel separately to be returned to location 1. As such, the food travel path for the food 50 is a subset of the shell travel path(s) $15P_1$, $15P_2$. FIGS. 1A–1C illustrate a few examples of the length of the travel paths $15P_1$, $15P_2$, which may extend through one or a series of processing environments.

The processing region 20 can include different processing environments. By way of illustration, as shown in FIGS. 1A–1C, the system 10 includes three different processing regions 20A (shown as a heating zone), 20B (shown as a thermal holding zone), and 20C (shown as a cooling zone), each of which can present a different environment for the food. The food 50 can travel encased in the mold cavity of the matably attached shell 15M throughout each processing region 20A, 20B, 20C as shown in FIG. 1C, or can be released from the shell 15M at a desired region and processed independent of the shell after traveling through a major portion of one region 20A (FIG. 1A) or two regions 20A, 20B (FIG. 1B).

In certain embodiments, the supply source 50S comprises an injection nozzle 50N that is configured and positioned to be serially in fluid communication with the rearward portions of shells proximate location 1. The nozzle 50N can be dynamically operated to be serially inserted into and retracted from the mold cavities defined by the shells 15M (or channels in fluid communication therewith) via an opening or at least one filling port 17. Alternatively, the nozzle 50N may be stationary, and the shell portions 15A, 15B operated and positioned to fold or close about the nozzle 50N temporarily as they move forward along the travel path.

In certain embodiments, as shown in FIGS. 1A–1C, the filling port 17 can be defined by a separation distance between the two shell portions 15A, 15B at a rearward portion of the respective shell portions 15A, 15B as they travel toward each other to sealably attach. The speed of forward movement of the shell portions as well as the flow rate of the emulsion can be selected to inhibit the undue loss of product as the cavity closes relatively rapidly.

Each mated shell 15M may be configured, independently of other shells, to define its respective (sealed) mold cavity. In certain embodiments, the forward and rearward edges of each mated shell 15M can have side, forward, and rear wall portions that sealably encase the mold cavity upon mating (not shown).

In other embodiments, adjacent pairs of shells 15M cooperate to define the sealed cavity. For example, in particular embodiments, between adjacent pairs of the mated shells 15M, the rearward wall portion of a first mated shell 15M may have a port 17 formed therein that allows the nozzle 50N to reside temporarily therein to direct emulsion into the corresponding inner mold cavity. In operation, the forward wall of the next adjacent rearwardly located shell can move forward to close off the mold cavity port 17 of the shell located directly in front thereof as the first mated shell 15M progress away from the nozzle 50N to thereby inhibit undue leakage or flashing of the emulsion from its respective mold cavity. As such, the mold assembly 15 may be configured so that the series of first and second shell portions 15A, 15B, respectively are closely positioned and aligned so that forward and rearward portions of adjacent mated shells 15M abut.

In yet other embodiments, the system 10 can be configured to provide a food compatible sealant that covers the port 17 to inhibit emulsion leakage after filling to a desired pressure. In still other embodiments, the nozzle 50N may be configured with a thermal probe that is able to provide localized thermal energy (heat or cooling) at sufficient energy levels and temperature to the emulsion material proximate the port after or during flowable filling to promote set-up or gelation thereat or to otherwise inhibit flow or leakage from the port 17 to thereby inhibit spill or leakage. Still further, the filling may be carried out with a valve that inhibits reverse flow. In particular embodiments, the filling can be carried out from a top portion of the mated shell and with a flow path configuration that inhibits reverse flow.

In certain embodiments, the mold cavities or one of more of the shell portions 15A, 15B can be preheated or precooled to cause the outermost portion of the emulsion to gel relatively quickly in the mold cavity, thereby inhibiting excessive spill, flashing, or leakage from the mold cavity. Combinations of the filling and/or leak-inhibiting operations described above may also be used.

Figure 1D:
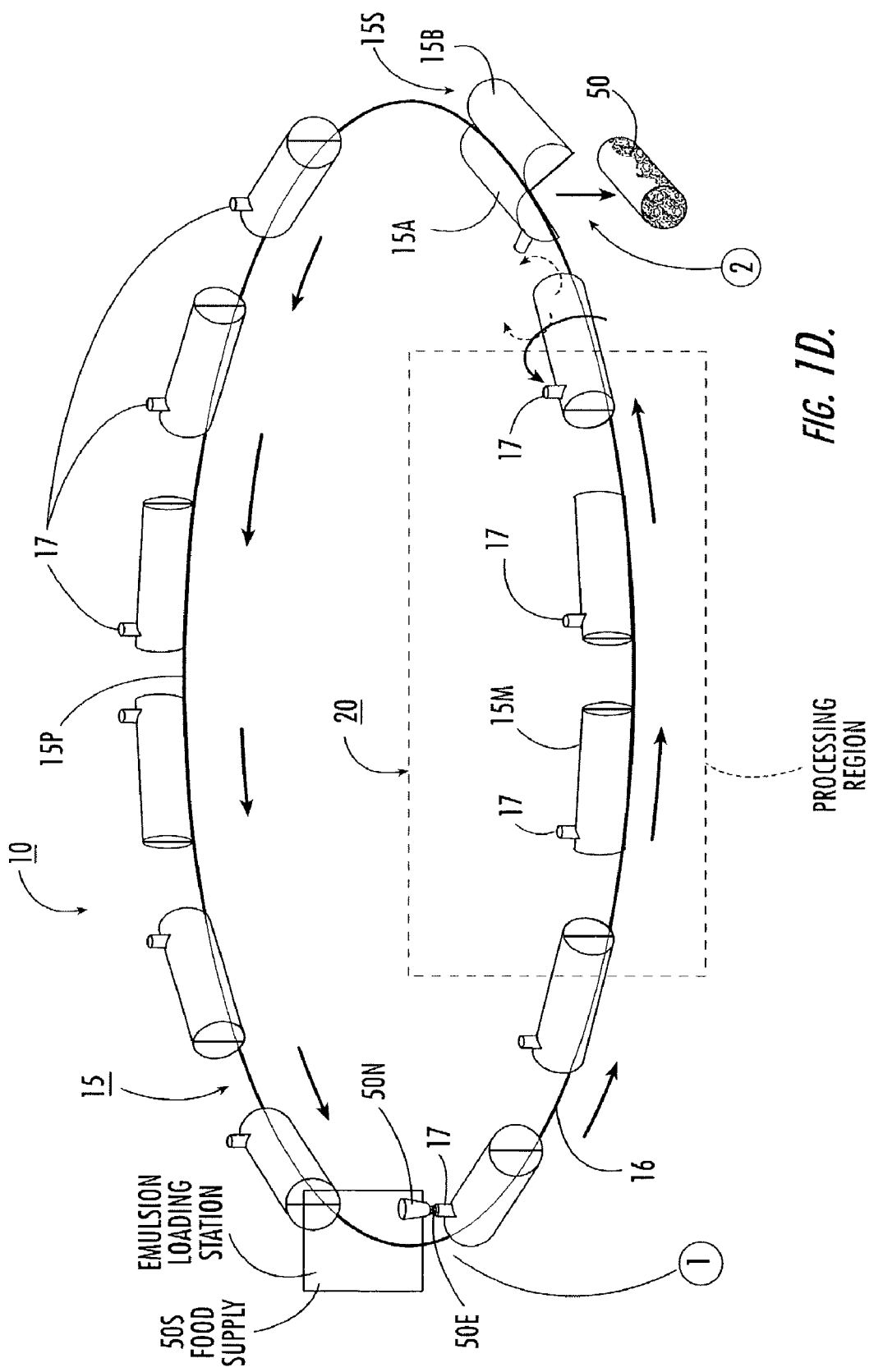
FIG. 1D is a schematic perspective view of a casingless production system employing traveling molds according to alternate embodiments of the present invention.

FIG. 1D illustrates an alternate embodiment of a mold assembly 15' for a processing system 10. As before, the mold assembly 15' comprises a plurality of matably attachable shell portions 15A, 15B that are driven or moved along a predetermined travel path 15P. However, in this embodiment, the shell portions 15A, 15B are hinged together and travel along a common travel path 15P, in an open or closed (mated 15M) configuration. Similar to the embodiment shown in FIG. 1A, the mated shell 15M defines a mold cavity that holds a quantity of food therein. After the food 50 takes on the shape of the mold cavity and has developed sufficient rigidity to maintain that shape when released therefrom, the shell 15M can be parted, separated, or opened (noted by feature 15s in FIG. 1D). Thus, the food alters from a flowable emulsion at location 1 to a non-flowable predetermined molded shape at location 2. The shell can be configured to open about a top, bottom, or side portion to release the food 50. The separation can be automatically carried out as the shell is traveling along the predetermined travel path based on a clock or a trigger or sensor positioned in the travel path that activates the initiation of the separation operation. Release members can force the shell portions 15A, 15B open, or locks holding the body closed can be released (not shown). As shown, in particular embodiments, the shell can open about a top hinged portion to flare outwardly and release the product 50 with the aid of gravity from the mold cavity.

The shell portions 15A, 15B can then be closed again and return to the supply 50S. The shell portions may remain open for a period of time to allow cleansing or sterilization of the internal mold cavity that may be located in a second processing region (not shown) along a portion of the travel path. The sterilization or cleansing may be carried out automatically by directing the travel path to extend through such a processing region.

In certain embodiments, the travel path and each respective shell 15M of the mold assembly 15' can be sized and configured to produce two products per cycle. That is, the system 10 can include a second filling station that is located after location 2, and the shells 15M can be mated again and directed to travel through a separate processing region, then configured to open up to release a second product prior to location 1 (not shown). Thus, the shells can mate together to close and open twice along a single cycle of their travel in the travel path 15P.

As shown in FIG. 1D, the mated shell 15M includes at least one port 17 that is in fluid communication with the internal mold cavity. As before, a filling nozzle 50N can engage with the port 17 to disperse the emulsion 50E therein. Multiple filling nozzles can be used and each or selected matable shells 15M can include a plurality of filling ports (not shown). The plurality of ports 17 may be disposed at spaced apart locations along the shell. The port 17 may be formed on the bottom, side, or top of the shell.

FIG. 2A illustrates the mold assembly 15 with the respective mold portions being configured one above the other. The nozzle 50N is illustrated in both FIGS. 2A and 3A as spaced apart from the shell with broken line leading edges for a clearer illustration of the flowable emulsion 50E. FIG. 2B illustrates axially extending opposing side seams associated with the traveling mold cavities defined by the shell configuration shown in FIG. 2A. FIG. 3A illustrates a side-to-side configuration of matable shell portions 15A, 15B, with opposing top and bottom axially extending seams of traveling mold cavities.

FIGS. 4A–4C illustrate examples of different internal mold cavity configurations 15C. Because the present invention is not limited to producing food items using casings, non-regular configurations (side profiles and/or cross-sectional profiles) can be produced. That is, although the mold may be configured to yield a cylindrical product with a substantially circular profile, other mold configurations may also be used. Each mold cavity 15C of the mated shells 15M can be configured to define a three-dimensional molded product (the same or different in selected ones of the shells on the mold assembly 15). The mold or shells can be formed of stainless steel (such as 316 stainless steel) or other food-compatible material. Suitable food-compatible coatings or lubricants may also be deposited onto the surfaces of the mold cavities to inhibit contact adherence thereto and promote ease of removal. Such coatings may be integral to the cavity material, or applied at desired intervals from an exogenous source.

Figure 12A:
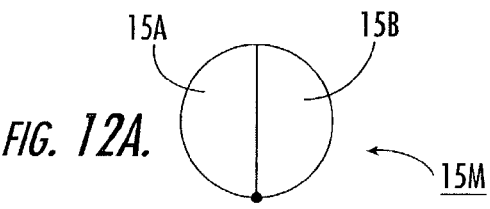
FIG. 12A is a schematic of a closed mold shell with a center parting line according to embodiments of the invention.
Figure 13A:
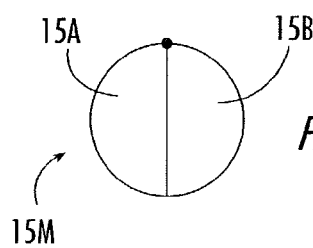
FIG. 13A is a schematic of a closed mold shell with a center parting line according to embodiments of the invention.
Figure 12B:
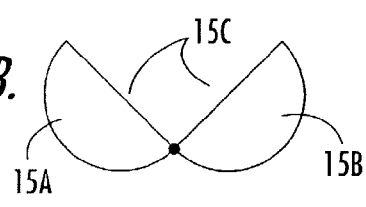
FIGS. 12B and 12C illustrate exemplary connections that allow separation of the two mold halves shown in FIG. 12A. The mold cavity can be oriented to open in an upward direction as shown.
Figure 13B:
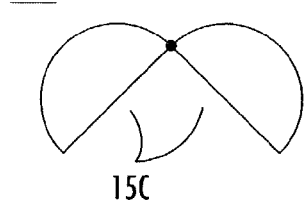
FIGS. 13B and 13C illustrate exemplary connections that allow separation of the two mold halves shown in FIG. 13A. The mold cavity can be oriented to open in a downward direction as shown.
Figure 12C:
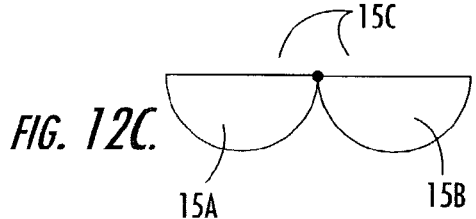
Figure 13C:
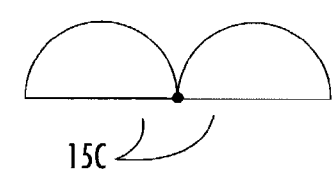

FIG. 12A is a schematic of a closed mold shell 15M with a center parting line according to embodiments of the invention. FIGS. 12B and 12C illustrate exemplary connections that allow separation of the two mold halves 15A, 15B shown in FIG. 12A. The mold cavity 15C can be oriented to open in an upward direction as shown. FIG. 13A is a schematic of a closed mold shell 15M with a center parting line according to embodiments of the invention. FIGS. 13B and 13C illustrate exemplary connections that allow separation of the two mold halves 15A, 15B shown in FIG. 13A. The mold cavity 15C can be oriented to open in a downward direction as shown. The mold components can be configured to separate a desired distance to allow access to the interior of the shell. They can be configured to entirely separate (as shown in FIGS. 1A–1C, 2A, 3A) or to remain attached. FIGS. 12B and 13B illustrate a partial angular separation and FIGS. 12C and 13C illustrate that the shells can be separated to at least about 180 degrees.

Figure 14A:
FIGS. 14A–14B are schematic illustrations of a multiple component mold shell that employs greater than two mating components according to certain embodiments of the present invention.
Figure 15A:
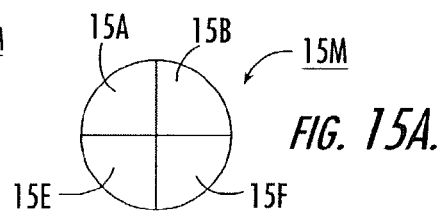
FIGS. 15A–15B are schematic illustrations of a multiple component mold shell that employs greater than two mating components according to certain embodiments of the present invention.
Figure 14B:
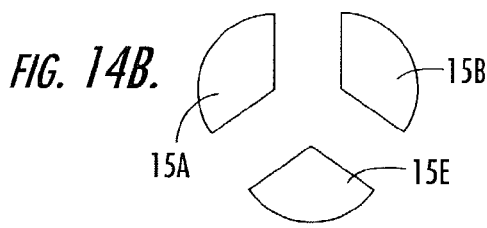
Figure 15B:
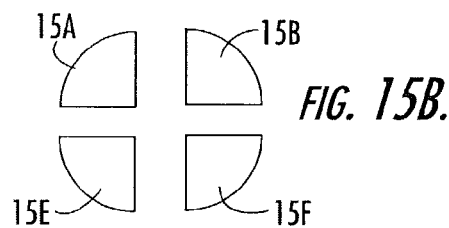

FIGS. 14A–14B are schematic illustrations of a multiple component mold shell 15M that employs greater than two matable components, shown as three components, 15A, 15B, 15E according to certain embodiments of the present invention. FIGS. 15A–15B illustrates a multiple component mold shell that employs four matable components, 15A, 15B, 15E, 15F.

Figure 16A:
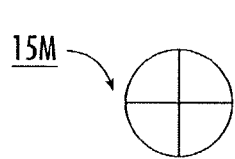
FIGS. 16A–16C are schematic illustrations of examples of mating alignments of mold components to define the enclosed cavity according to embodiments of the present invention.
Figure 16B:
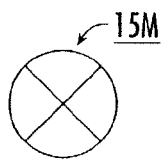
Figure 16C:
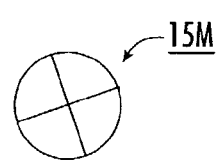

FIGS. 16A–16C are schematic illustrations of examples of mating alignments of mold components or orientations of parting lines of components that can come together to define the enclosed cavity 15C according to embodiments of the present invention.

Turning back to FIGS. 4A–4C, the mold cavities may be such that a single discrete product is produced for a single shell cavity 15C (FIG. 4A), a plurality of object shapes can be produced within a single shell cavity 15C (FIG. 4B), or a plurality of adjacent shell cavities can be configured to produce a single object shape (FIG. 4C).

FIGS. 5A–5E illustrate that the mold cavities can be configured to provide molded food product in non-conventional or irregular cross-sectional (and/or side sectional) shapes. FIG. 5A illustrates a block shape (such as square or rectangular) 50a. If molded in an elongate shell, this configuration would be similar to a bar (not shown). FIG. 5B illustrates a crescent shape molded food product 50b. FIG. 5C illustrates a curvilinear or winged object 50c, while FIG. 5D illustrates a star shaped product 50d. FIG. 5E illustrates a football shape 50e (that can be produced in the axial and/or transverse direction). Thus, the shell mold cavity 15C configuration can be selected to provide a non-circular cross-sectional product, a product with an irregular complex or non-constant shape cross-sectional profile, and/or an irregular side profile with an elongate but non-cylindrical shape.

FIG. 6A illustrates that the inner wall or surface of respective shell cavities can include surface indicia 21 positioned thereon. The surface indicia 21 can be configured in a pattern corresponding to the surface pattern desired to be formed into the externally viewable surface of the molded food product. The surface indicia can be formed a desired depth into the outer surface of the product, depending on the configuration of the indicia in the cavity. As such, the surface indicia pattern 21 can be configured as a recessed female deformation pattern (FIG. 6A) or as a raised male deformation pattern (FIG. 6B). One or both sides of the shell portions, 15A, 15B can include the same, different, or cooperating complementary indicia that together define a continuous pattern extending over the outer surface of the object 50. The depth or projection distance of the surface indicia can be configured to provide a sufficiently prominent transferred pattern formed onto the exterior of the food product as the emulsion flows into the mold cavity 15C and takes on the molded shape of the object defined by the mold cavity 15C as the food object 50 is moved along the predetermined travel path in the food processing system. In certain embodiments, the surface indicia 21 can comprise alphanumeric indicia. In particular embodiments, the surface indicia can include a design shape, decorative pattern, or figure, such as a product or company logo, mark, and the like. In other embodiments, the inner wall of the cavity 15C can be configured to impart a desired surface marking or texture, such as representing seared grill marks, predetermined visually darker regions, and the like. In particular embodiments, the surface indicia 21 can be provided by recessed wells (female deformations) that can hold a dye to allow for selective color application.

FIGS. 7A and 7B illustrate that the product 50 can be processed in different manners, each of which may generate a different distribution pattern of the emulsion to the molded product. FIGS. 7A and 7B each illustrate a processing region thermal zone over the length of which the product undergoes the heating and molding into a structurally suitable shaped (non-flowable) product. FIG. 8 illustrates a similar variation using a cooling source to produce the molded product 50. The darker shades rendered in the graduated shading shown in FIGS. 7A, 7B, and 8 illustrate cooked, frozen, or increased density alterations in the emulsion 50E from its original flowable state.

Turning back to FIG. 1A, as discussed above, the processing region 20 can include one or a plurality of different treatment zones or environments. In applications that cook or heat the product 50, the cooking, heating and/or cooling can be carried out by any suitable energy generating means as discussed above, including, but not limited to microwave, RF, UV light, laser energy, thermal energy (heating in a conventional convection or conduction oven or cooling of freezing in refrigerators/freezers), radiation energy, and the like. As such, as the emulsion 50E in the shell 15M travels through the processing region 20, along the predetermined travel path, it can be heated for predetermined times and temperatures.

Figure 9A:
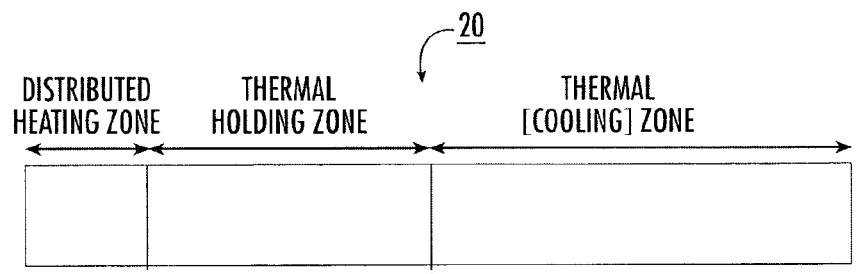
FIG. 9A illustrates three different exemplary processing conditions along a food travel path according to embodiments of the present invention.
Figure 9B:
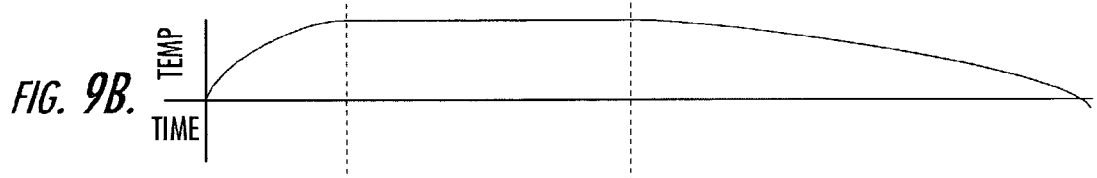
FIGS. 9B–9E are graphs of profiles of processing temperature as a function of time for the system of FIG. 9A according to embodiments of the present invention.
Figure 9C:
Figure 9D:
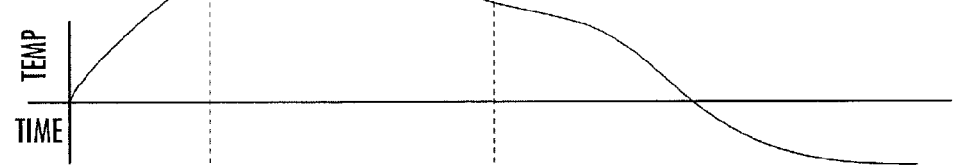

In certain embodiments, as shown in FIG. 9A, the processing region 20 comprises three different treatment zones: (a) an active or distributed energy generating zone that is used to expose the food emulsion to a desired thermal energy at a desired time versus temperature profile; (b) a thermal (equilibrium) holding zone where the temperature of the product is held substantially constant; and (c) a thermal cooling zone where the temperature of the product is reduced. FIGS. 9B–9D illustrate examples of different time versus temperature profiles of exemplary processing conditions corresponding to the different processing regions. The temperature profile may correspond to a selected location in the product (such as a center region of the product to promote reliable cooking). Other temperature profiles, residence times, and the like, can be used depending on the application.

FIG. 9A illustrates that the product temperature is returned to ambient temperature and the thermal holding zone can hold the emulsion at a substantially constant internal temperature. FIG. 9B illustrates that the thermal holding zone may raise the internal temperature and then lower the product temperature to a cooled or frozen refrigerated temperature (the line extending below the initial condition). FIG. 9C illustrates that the thermal holding zone can allow the product to increase in temperature and then hold a substantially constant temperature for a desired time. FIG. 9D illustrates that the holding zone may decrease the internal temperature before the product enters the cooling zone. The cooling zone in FIG. 9A may be non-active or non-force cooled (fans or natural air cooling can be used) to return the product to ambient.

Figure 9E:
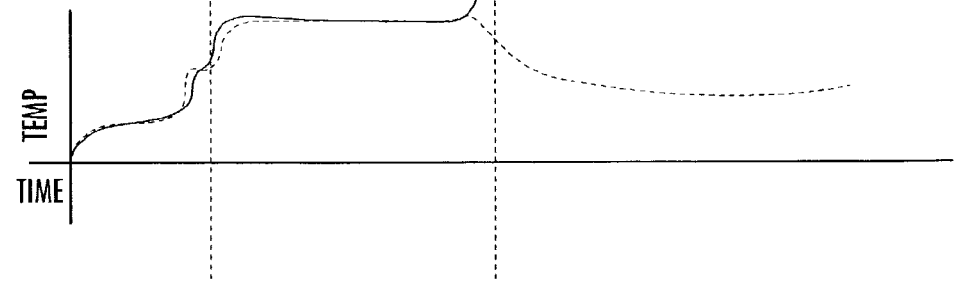

FIG. 9E illustrates that the last thermal zone may be another heating zone (top line) or a cooling zone (broken bottom line). Each thermal region may increase (or decrease) the temperature and then hold that temperature for a desired time. The top line indicates that the thermal temperature is increased in the initial portion of each thermal zone. Other heating and cooling cycles or operations may also be used.

In particular embodiments, the thermal heating zone and/or the thermal holding zone are configured to raise the internal temperature of the emulsion to a desired temperature for a desired time. For example, in certain embodiments, the processing region 20 can be configured to raise the internal temperature of the shell enclosed emulsion 50E so that it reaches at least about 150 degrees Fahrenheit for a predetermined time. In particular embodiments, for meat emulsions, the product may be cooked to an internal temperature of about 158 degrees Fahrenheit.

In other embodiments, the product 50 can be cooked and then frozen in preparation for shipment. The product should be structurally sufficient (such as after cooking but before freezing) so that the object 50 can substantially withstand its molded shape when removed from its molding shell. In yet other embodiments, the product 50 can be directly frozen without cooking (typically for food intended to be eaten in a frozen state).

In certain embodiments, the processing region 20 is configured to heat the emulsion with one or more microwave energy generators to generate about 400–600 kW of microwave energy generated in the thermal distribution region to cook the emulsion in the shells for predetermined times and energy levels as the emulsion travels enclosed in the shells along the predetermined travel path. For example, five 100 kW generators operating at about 85% efficiency can generate about 425 kW of microwave energy that can be directed to a certain (typically shielded) portion of the processing region 20.

In particular embodiments, the processing conditions can be set to introduce a simulated skin layer onto the outer surface of the emulsion before its release from the mold. That is relatively hot or high-energy applied to the outer perimeter can provide an increased density or drier region relative to the inner portion of the resultant non-flowable edible product. The depth or thickness, as well as the density or hardness of the skin layer can be adjusted by the processing conditions. The shell itself may be heated (or preheated) to apply contact heat that is localized at the outer surface. In other embodiments, RF or microwave energy and the like can be used.

As shown in FIG. 10A, the system 10' can include a plurality of separate traveling mold assemblies 15$_1$, 15$_2$, a respective one for each different production line. As shown, the mold assemblies 15$_1$, 15$_2$ can be configured to travel through a common processing region 20. Thus, each production line can include shell portions 15A, 15B, with associated travel paths 15P (if similar to the embodiment shown in FIG. 1D) or, for corresponding pairs of paths 15P$_1$, 15P$_2$, as shown in FIG. 10A, each producing a line of molded product. As such, the mold shells 15M for each production line can be directed to travel through the processing region concurrently (using a processing region configured to surround a plurality of production lines, with a shared heating, holding and/or cooling region). Each line may be operated to yield the same product in the same or different shapes or sizes, or different products. The system 10' may include a central controller 30 that directs the operation of a plurality of different energy sources 30$e$. The controller 30 can adjust the energy generated depending on the type of product traveling in the processing region (such as the size of the mold (volume) and/or type of emulsion mixture in the mold). The energy sources 30$e$ may be of the same type and operated to maintain a homogenous or constant energy or temperature region in the processing region. Alternatively, selected ones of the energy sources 30$e$ may be operated to produce local "hot" or "cold" spots or a graduated heating or cooling treatment zones as desired. FIG. 10A also illustrates that the temperature of the product can be raised from a first starting temperature $T_1$ to a second cooked temperature, $T_2$ that is at least about double the starting temperature measured in degrees Fahrenheit. As shown, the food emulsion may start at a temperature of about 50 degrees Fahrenheit and be processed to reach a temperature of about 158 degrees Fahrenheit.

FIG. 10A illustrates that the lines may be oriented one above the other and directed to flow in a substantially horizontal throughput configuration, with the shell portions 15A, 15B, traveling in a horizontal forward and rearward directions for a major portion of the length of the travel path $15p_1$, $15p_2$. FIG. 10B illustrates an example of two lines of mold assemblies $15_1$, $15_2$ used to move the product through the processing region. FIG. 10C illustrates that the lines may be configured in side-by-side alignment and oriented to move in a vertical throughput configuration, with the shell portions 15A, 15B traveling in a vertically upward or downward direction for a major portion of the length of the travel path $15p_1$, $15p_2$.

FIG. 11A illustrates a system 10" with a nested configuration of three production lines 100, 101, 102, using two mold assemblies $15_1$, $15_2$ that are spaced apart in cooperating alignment to define the intermediate production line 101. Thus, the intermediate production line 101 employs mold shells provided from the upper and lower mold assemblies $15_1$, $15_2$. The intermediate line 101 produces the food product 50 in an opposing direction from the upper and lower lines 100, 102 (or opposing side lines 100, 102 as shown in FIG. 11C). Thus, the system 10" can provide three sets of mated traveling mold shells using two different mold assemblies $15_1$, $15_2$ (similar to that shown in FIGS. 10A–10C). FIG. 11C again illustrates that the lines 100–102 may be operated in a vertical orientation.

In certain embodiments, the devices and methods of the present invention can be used to continually automatically produce a series of discrete products 50 held in a corresponding series of endlessly traveling mold shells that meet to define an encased cavity that is configured to receive the flowable product and mold it to a desired shape defined by the mold cavity. In particular embodiments, the traveling mold shells are opposing "caterpillar" molds that meet and separate to travel separate aligned paths. The term "continually" means that the apparatus can be configured to expel or provide a series of products substantially constantly over a production shift or batch. In certain embodiments, the systems 10, 10', 10" can be configured to process individual shells with emulsions therein to product at a rate of about at least 1 fps.

In particular embodiments, certain systems contemplated by the present invention may produce over about 200 linear feet of elongate consumable meat product in less than about five minutes. Such an automated process may be employed without requiring direct manual labor to form or remove the products from the shell, and, hence, may be particularly suitable for mass-production environments. In other particular embodiments, the system 10, 10', 10" may be configured with one or more production lines running at a rate of about 1, fps, typically at least about 3 fps or more, such as about 5 fps, to produce about 5,000–10,000 lbs/hour of the same or different food products using the matable shells contemplated by the present invention.

In certain embodiments, a food grade or food compatible film or coating can be deposited on the inner surface of the shell portions 15A, 15B (in the mold cavity) to inhibit the food product from adhering thereto during processing, thereby promoting its release. The shell portions 15A, 15B may be formed of a stainless steel material or other suitable food production grade material that can be sterilized and cleansed. The materials and coatings can be selected to allow the shells to be re-used over many production cycles.

The thickness and type of materials selected to form the shells and/or the mold cavities that contact and hold the food material may depend on the production environments that the food will be exposed to as well as the configuration (type and size) of the food being processed. For example, light, microwave, thermal (heat and/or cooling), and RF energies may have different demands that promote uniform and reliable transfer of the treatment to the food product and/or suitable exposures and exposure rates in an aesthetically acceptable manner.

In certain embodiments, one of the shell portions 15A, 15B may be configured with an optically viewable window for optical assessment of the state of the product. The systems 10, 10', 10" may be configured to cook, freeze, smoke, cure, pickle, partially dehydrate, or otherwise process the food 50 as it moves through the processing region(s) 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A method for producing food products, comprising:
   providing a series of shells, the shells having sufficient structural rigidity to define an enclosed cavity space of predetermined substantially constant size and shape;
   injecting a quantity of flowable food emulsion into the shells at an injection location along a predetermined travel path;
   moving the shells forward along the predetermined travel path with the emulsion in the enclosed cavities;
   exposing the emulsion in the shells to predetermined processing conditions that alter the emulsion held in the respective shells to a non-flowable edible food product having the molded shape of their respective shell cavities; and then
   releasing the non-flowable food products from their respective shells at a second location spaced apart from the injection location along the predetermined travel path;
   wherein the shells comprise shell portions that mate together prior to the injecting step to encase the flowable emulsion and separate during the releasing step to release the non-flowable food product, and wherein, when the shell portions are mated together, adjacent shells travel generally in concert and generally aligned with the emulsion therein along at least a portion of the predetermined travel path.

2. A method according to claim 1, wherein the moving step is substantially constant, and wherein the shells are aligned and configured to travel along one or more endless paths associated with the predetermined travel path.

3. A method according to claim 2, wherein the matable shell portions are matable first and second shell portions that mate together to encase the flowable emulsion and separate to release the non-flowable food product.

4. A method according to claim 3, wherein the first and second shell portions are configured to serially travel in the predetermined travel path so as to mate together at a first location to define an enclosed elongate cavity and travel together for a first portion of the predetermined travel path, then separate at a second location and travel separately and spaced apart for a second portion of the predetermined travel path, the second portion of the travel path being configured to return the first and second shell portions to the first location.

5. A method according to claim 1, wherein the shells have opposing top and bottom portions and opposing end portions, and wherein the step of injecting is carried out by injecting the emulsion into a port on an end portion of the shell to generally fill the enclosed shell cavity.

6. A method according to claim 1, wherein the shells have opposing top and bottom portions and opposing end portions, and wherein the step of injecting is carried out by injecting the emulsion into a port on at least one of the top or bottom portion of the shell with the shell portions mated together.

7. A method according to claim 1, wherein the step of moving comprises moving the enclosed shell with the emulsion in a substantially vertical orientation along at least a portion of the predetermined travel path.

8. A method according to claim 1, wherein the step of moving comprises moving the enclosed shell with the emulsion in a substantially horizontal orientation along at least a portion of the predetermined travel path.

9. A method according to claim 1, further comprising injecting the emulsion with sufficient pressure that surface indicia positioned on the inner surface of the respective shell cavities imprints a desired pattern onto the exterior of the food product as the emulsion is moved along the predetermined travel path during the exposing step.

10. A method according to claim 9, wherein the surface indicia comprises alphanumeric indicia.

11. A method according to claim 9, wherein the surface indicia comprises a logo.

12. A method according to claim 1, wherein the step of molding is carried out to provide a product with an irregular cross-sectional profile.

13. A method according to claim 1, wherein the step of molding is carried out to provide a product with a non-circular cross-sectional profile.

14. A method according to claim 1, wherein the step of molding is carried out to provide a product with an irregular side profile.

15. A method according to claim 1, wherein the step of molding is carried out to provide a product with a non-cylindrical shape.

16. A method according to claim 1, wherein the exposing step comprises heating the emulsion for predetermined times and temperatures as the emulsion travels enclosed in the shells along the predetermined travel path.

17. A method according to claim 16, wherein the heating step is carried out to raise the internal temperature of the enclosed emulsion to at least about 150 degrees F.

18. A method according to claim 1, wherein the exposing step comprises cooling the emulsion for predetermined times and temperatures as the emulsion travels enclosed in the shells along the predetermined travel path.

19. A method according to claim 1, wherein the exposing step comprises directing microwave energy at the emulsion in the shells for predetermined times and energy levels as the emulsion travels enclosed in the shells along the predetermined travel path.

20. A method according to claim 1, wherein the exposing step comprises directing RF energy at the emulsion in the shells for predetermined times and energy levels as the emulsion travels enclosed in the shells along the predetermined travel path.

21. A method according to claim 1, wherein the injecting is carried out at a flow rate of at least about 1 fps.

22. A method according to claim 1, wherein the injecting step is carried out to at a sufficient pressure to cause the emulsion to fill the volume of the cavity.

23. A method according to claim 1, wherein the flowable emulsion in the injecting step is a flowable meat based emulsion having an associated viscosity.

24. A method according to claim 1, wherein the emulsion comprises at least one type of meat.

25. A method according to claim 24, wherein the emulsion comprises at lent one of pork, beef lamb, veal, and poultry and/or analogs or derivatives thereof.

26. A method according to claim 24, wherein the emulsion comprises ground pork, ground beef and ground veal and/or selected ones or combinations of analogs or derivatives thereof.

27. A method according to claim 1, wherein the non-flowable edible food product comprises hot dogs.

28. A method according to claim 1, wherein the non-flowable edible food product comprises sausages.

29. A method according to claim 1, further comprising introducing a simulated skin onto the outer surface of the emulsion during said exposing step prior to said releasing step.

30. A system for producing food products, comprising:
means for automatically providing a series of discrete shells with alignable releasably matable shell members, the shells having sufficient structural rigidity to define an enclosed cavity space of predetermined substantially constant size and shape, with a plurality of shells being configured to travel generally in concert along at least a portion of a predetermined travel path;
means for injecting a quantity of flowable food emulsion into the shells in serial order;
means for automatically moving the shells forward along the predetermined travel path with the emulsion in the enclosed cavities;
means for exposing the emulsion in the shells to predetermined processing conditions that alter the emulsion held in the respective shells to a non-flowable edible food product having the molded shape of their respective shell cavities; and
means for automatically releasing the non-flowable food products from their respective shells after the means for exposing exposes the emulsion to desired processing conditions.

31. A system according to claim 30, wherein the means for automatically providing a series of discrete shells with alignable releasably matable shell members comprises first and second releasably matable shell members that are configured to generally continuously travel first and second predetermined endless travel paths, the first and second endless travel paths being configured to bring the first and second shell members matably together at a first location of the predetermined travel path to define an enclosed elongate shell cavity that remains intact for a distance along the predetermined travel path, then separates the first and second shell members at a second location, allowing the respective first and second shell members to complete their respective endless paths before again meeting at the first location.

32. A method for producing food products, comprising:
providing a series of shells, the shells having cooperating members that mate and provide sufficient structural rigidity to define an enclosed cavity space of predetermined substantially constant size and shape;
injecting a quantity of flowable food emulsion into the shells in serial order;
moving the shells forward along a predetermined travel path with the emulsion in the enclosed cavities contacting a respective shell inner wall without a deformable reusable support held between the shell and the food emulsion;
exposing the emulsion in the shells to predetermined processing conditions that alter the emulsion held in the respective shells to a non-flowable edible food product having the molded shape of their respective shell cavities; then
releasing the non-flowable food products from their respective shells at a location that is downstream of where the injecting is carried out along the predetermined travel path.

33. A method according to claim 32, further comprising injecting the emulsion with sufficient pressure such that surface indicia positioned on the inner surface of the respective shell cavities imprints a desired pattern onto the exterior of the food product as the emulsion is moved along the predetermined travel path during the exposing step.

34. A method according to claim 33, wherein the surface indicia comprises alphanumeric indicia.

35. A method according to claim 33, wherein the surface indicia comprises a logo.

36. A method according to claim 32, wherein the step of molding is carried out to provide a product with an irregular cross-sectional profile.

37. A method according to claim 32, wherein the step of molding is carried out to provide a product with a non-circular cross-sectional profile.

38. A method according to claim 32, wherein the step of molding is carried out to provide a product with an irregular side profile.

39. A method according to claim 32, wherein the step of molding is carried out to provide a product with a non-cylindrical shape.

40. A method according to claim 32, further comprising introducing a simulated skin onto the outer surface of the emulsion during and/or after said exposing step prior to said releasing step.

41. A method according to claim 32, wherein respective shell cooperating members include first and second shell portions that are configured to generally continuously travel first and second predetermined endless travel paths, the first and second endless travel paths being configured to bring the first and second shell portions matably together at a first location of the predetermined travel path to define an enclosed elongate shell cavity that remains intact for a distance along the predetermined travel path, then separates the first and second shell portions at a second location, allowing the respective first and second shell portions to complete their respective endless paths before again meeting at the first location.

* * * * *